United States Patent [19]

Ohlig

[11] Patent Number: 4,705,392
[45] Date of Patent: Nov. 10, 1987

[54] VACUUM APPARATUS BLANKET AND METHOD OF MAKING THE SAME

[76] Inventor: Albert H. Ohlig, 487 Esther St., Costa Mesa, Calif. 92627

[21] Appl. No.: 901,895

[22] Filed: Aug. 29, 1986

[51] Int. Cl.$^4$ .............................................. G03B 27/20
[52] U.S. Cl. .................................... 355/91; 427/393.5; 428/909
[58] Field of Search ...................... 427/393.5; 428/909; 355/91–94, 99, 73, 76

[56] References Cited

U.S. PATENT DOCUMENTS 4,234,640  11/1980  Wittel ............................. 428/909 X
4,423,851  1/1984  Heitmann ......................... 355/91 X Primary Examiner—Richard A. Wintercorn
Attorney, Agent, or Firm—A. C. Smith

[57] ABSTRACT

Method and means are disclosed for producing an improved vacuum blanket with a pattern of air-flow passages that is formed on the underside surface of the air-impervious blanket using conventional printing techniques. The blanket forms an air-tight seal over and around the perimeter of a glass exposure plate, and residual air may be evacuated from beneath the blanket through porous regions beyond the edges of the glass exposure plate.

6 Claims, 5 Drawing Figures

VACUUM APPARATUS BLANKET AND METHOD OF MAKING THE SAME

RELATED APPLICATION

This application relates to the subject matter disclosed in U.S. patent application Ser. No. 902,148, filed on Aug. 29, 1986, by Ernest Ohlig, and Conrad B. Sloop, entitled "Photographic Registration Apparatus and Method."

BACKGROUND AND SUMMARY OF THE INVENTION

This invention relates to an air-impervious flexible blanket suitable for overlaying sheets of photographic material on contact exposure apparatus. More specifically, this invention relates to the method and means for producing operable air flow channels on the underside of the flexible blanket using printing techniques.

In contact exposure applications, vacuum is used to establish an even and close contact between the original and the photosensitive materials. These photo materials may be film, paper, metal or plastic plates, silk screens, or the like. Often the exposure requires the sandwiching of several layers of such materials.

To facilitate the vacuum contact system, flexible blankets are used to cover the materials. The border of these blankets, usually made of rubber, seal against the glass surface through which the exposure is made. The blanket itself includes one or more evacuation valves in the corners. Once the vacuum pump is activated, the air above, below and in-between the materials and the glass is evacuated to establish good contact registration.

One disadvantage encountered in these known schemes is that the vacuum being drawn from the corners and the sides first evacuates the air closest to the valves. At these points, usually along the sides, the materials bind and seal quickly, trapping air pockets in the center area that take a long time to evacuate completely. To overcome this problem it is common that the vacuum is activated in two stages with a pause after the initial draw to just a few inches of mercury. This reduces the problem of binding when the full vacuum is drawn to 23-26 inches of mercury. This does, however, increase the time required per operation. Techniques have been developed to squeeze out entrapped pockets of air, as described in the literature (See, for example, U.S. Pat. No. 4,504,142).

One known scheme for keeping the air passage open to the middle of the frame is through a molded pattern on the blanket. However, this scheme does not help evacuation between the materials, and it also raises the total volume to be evacuated and, worst of all, it often causes a distinct pattern to be embedded in the exposed surface by the pressure points in the pattern. Molding such blankets usually requires a substantial tooling charge in large sizes. In order to avoid this cost and due to the many varied blanket sizes used, most manufacturers produce pre molded material in continuous sheets, and then cut the sheet and either grind the outer edges smooth or vulcanize a straight molding along the edges that can vacuum seal to the glass plate. Because these blankets are often exposed to high intensity ultra-violet light rays, the rubber deteriorates requiring periodic replacement at great cost.

In accordance with the present invention there is provided a method and means by which a suitable pattern of air passages can be produced on standard stock of flexible sheet blanket material. More specifically, the present invention uses standard printing techniques to emboss the desired pattern on the underside surface of a rubber or plastic or other elastomeric sheet. The pattern may be silk screened or otherwise printed onto one surface of the blanket using curable liquid material to provide spacing between blanket and sheet material to facilitate efficient evacuation of air. In another embodiment that starts with conventional, patterned blanket material, the outer edge may be silk-screened or otherwise printed to fill the pattern with curable liquid material to provide a smooth perimeter edge which will establish an air-tight seal, and which therefore obviates the need to grind the edge smooth. A wide variety of patterns can be developed for different applications including patterns that are elevated or wider in the middle than at the edges. This is particularly advantageous with certain photographic sheets that are sensitive to the point pressures of blanket patterns since screened or printed patterns produced according to the present invention have smooth edges and can be applied to a soft, elastomeric blanket. The curable liquid material that is screened or otherwise printed onto the blanket may be inks or paints with sufficient plasticizers and additives to retain a cured height of a few thousandths of an inch.

In accordance with the present invention, an improved vacuum system evacuates residual air from beneath this blanket through vias or channels that are located beyond the perimeter of the glass exposure plate.

DESCRIPTION OF THE PREFERRED EMBODIMENT

Figure 1:
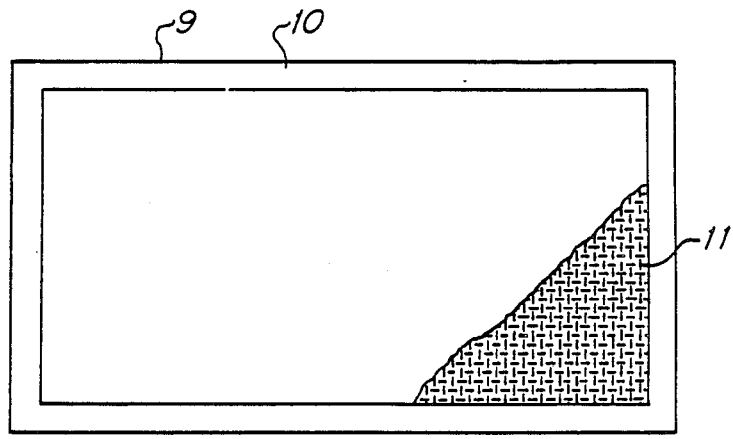
FIG. 1 is a pictorial representation of a conventional vacuum blanket.

Referring now to FIG. 1, there is shown a conventional vacuum blanket 9 which is formed of a flexible sheet of neoprene rubber or plastic or other suitable elastomeric material. On the underside of the sheet, there is shown a border region 10 around the perimeter of the sheet which has smooth surface properties conducive to forming an air tight seal with a glass plate upon which the sheet is placed. Within the border region 10 there is shown a conventional weave-like pattern 11 which is formed as embossed ridges or grooves in the pattern illustrated. This weave-like pattern is intended to assure that residual volumes of air contained within the border region 10 sealed against a glass plate can be evacuated and can diffuse from regions of the surface contained within the border region 10. Such conventional vacuum blankets are commonly cast or rolled or extruded and embossed with the pattern during the production of the sheet. After the sheet 9 is cut to length and width, the portion of the pattern 11 which exists in the border region 10 is commonly ground down or re-vulcanized to obliterate the pattern and leave a smooth surface suitable for forming a vacuum seal.

Figure 2:
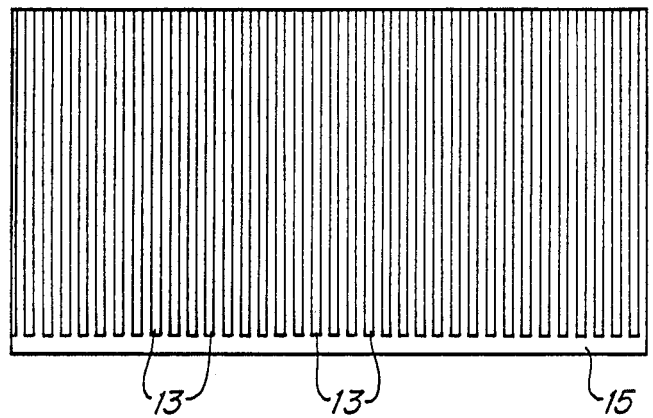
FIG. 2 is a pictorial representation of a vacuum blanket prepared in accordance with the present invention having one standard pattern printed thereon.
Figure 3:
FIG. 3 is a cross-sectional view of the blanket of FIG. 2.

In accordance with the present invention, standard sheet stock of a flexible material such as neoprene rubber, or plastic or other elastomeric material may be formed in substantial sheets and then cut to desired length and width. Thereafter, suitable air flow channels, such as parallel ridges as illustrated in FIG. 2, may be printed upon the underside surface of the sheet only in regions where it is desirable to provide a raised pattern. Thus, as illustrated in FIG. 2 and in the cross sectional view of FIG. 3, raised ridges may be printed on the underside surface only in the regions where it is desirable to have air migrate from within the region. These ridges 13 are formed by laying down ink, or paint or other suitable curable fluid material in the desired patter using conventional printing or silk screening techniques. The printing process can be controlled conveniently to avoid placing ridges of the pattern in regions 15 where it is desirable to leave the surface of the sheet undisturbed suitable for forming an air-tight seal or a manifold channel coupled to the spaces between ridges 13.

Figure 4:
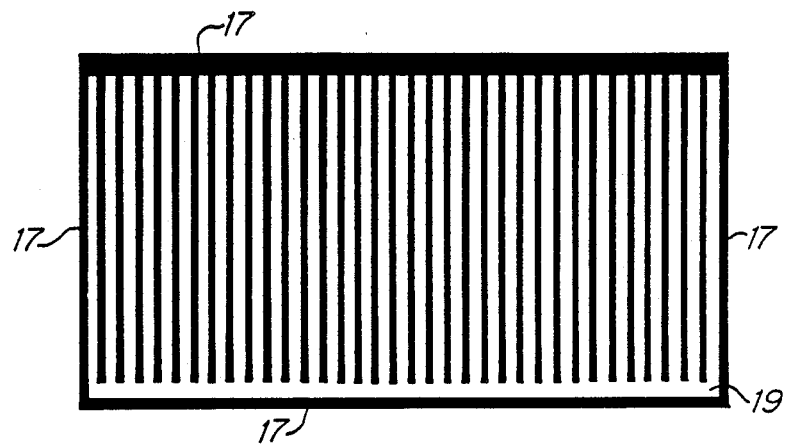
FIG. 4 is a pictorial representation of the vacuum blanket of the present invention having a continuous perimeter pattern.

Alternatively, as illustrated in FIG. 4, the pattern to be printed onto the underside surface of the blanket may include a continuous perimeter region 17 which is conducive to establishing an air-tight seal against an exposure plate. Similarly, where the sheet stock material includes a molder pattern, the sealing perimeter edge 17 may be printed thereon with sufficient thickness to fill the molded pattern and leave a smooth perimeter edge 17 that is conducive to forming an air tight seal against an exposure plate.

In each of the embodiments of the invention described above, the curable liquid material forms an inhomogeneous bond with the sheet and may be ink such as rubber, vinyl or epoxy in which plasticizers, rubber, or other additives have been added. Alternatively, the curable liquid material may be liquid rubber compound such as photo polymers which, like the ink or paint compounds previously described, forms the liquid material that can be silk screened in the desired pattern and that adheres to the sheet when dried or cured. Each such curable liquid material retains sufficient incompressibility when cured to maintain substantially the depth of the pattern under the compressive force of air pressure exerted upo the opposite side of the sheet as vacuum is established on the pattern side of the sheet.

Figure 5:
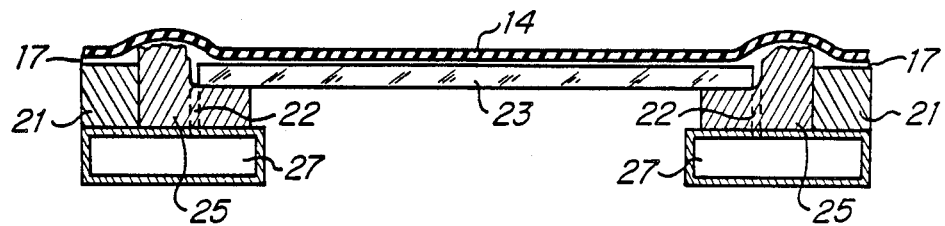
FIG. 5 is a sectional view of a frame surrounding an exposure plate and vacuum blanket according to the present invention.

In accordance with the present invention, a conduit or channel 19 for evacuating air from under the blanket may be formed as a mainfold in the printed pattern of parallel ridges as illustrated in FIG. 4, to assure that residual air is uniformly removable from all regions within the perimeter seal 17. Thus, as illustrated in the sectional view of FIG. 5, the perimeter seal may be formed about the surface of a frame 21 which surrounds the exposure plate 23. The passages 22 in the gasket 25 between frame 21 and plate 23 permit air to be evacuated from under the blanket 14 and these passages may be aligned with the channel 19 in the pattern. Vacuum duct 27 and pumping apparatus connected thereto (not illustrated) thus permit the air pressure on the underside of the blanket to be reduced. The present invention thus permits full utilization of the glass exposure plate 23 and obviates the expense commonly involved in forming vacuum ports through the glass exposure plate with which a vacuum blanket seals.

Therefore, the present invention provides inexpensive method and means for forming air evacuation channels in the underside of a vacuum blanket for evacuating residual air from under the blanket.

I claim:

1. The method of forming a flexible vacuum banket, comprising the steps of:
   depositing upon one surface of the sheet in selected portions of the area thereof a plurality of protrusions of a curable fluid material that adheres to the sheet to form therewith a non homogeneous sheet including a selected array of said protrusions, and
   curing the fluid material to form flexible protrusions where deposited which are substantially incapable of being compressed into the surface of the sheet for forming fluid channels around the protrusions.

2. The method as in claim 1 wherein in the step of depositing, the fluid material is excluded from regions about the perimeter of the sheet.

3. The method as in claim 1 wherein in the step of depositing, the fluid material is printed in said array of protrusions substantially simultaneously.

4. The method as in claim 1 wherein in the step of depositing, the fluid material is disposed about the perimeter of the sheet to form a region that after curing is capable of forming a vacuum seal.

5. Vacuum blanket apparatus comprising:
   a sheet of rubber of selected length and width having upper and lower surfaces; and
   a plurality of protrusions of ink deposited and cured to substantial incompressability adhered on one surface of the sheet in spaced array to provide fluid passages around the protrusions.

6. Vacuum blanket apparatus comprising:
   a sheet of rubber of selected length and width having upper and lower surfaces; and
   a plurality of protrusions of paint deposited and cured to substantial incompressibility adhered on one surface of the sheet in spaced array to provide fluid passages around the protrusions.

* * * * *